United States Patent
Krizhevsky et al.

(10) Patent No.: US 9,251,437 B2
(45) Date of Patent: Feb. 2, 2016

(54) SYSTEM AND METHOD FOR GENERATING TRAINING CASES FOR IMAGE CLASSIFICATION

(71) Applicant: Google Inc., Mountain View, CA (US)

(72) Inventors: Alexander Krizhevsky, Toronto (CA); Ilya Sutskever, Mountain View, CA (US); Geoffrey E. Hinton, Toronto (CA)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 13/970,869

(22) Filed: Aug. 20, 2013

(65) Prior Publication Data

US 2014/0177947 A1 Jun. 26, 2014

Related U.S. Application Data

(60) Provisional application No. 61/745,713, filed on Dec. 24, 2012.

(51) Int. Cl.
*G06K 9/62* (2006.01)

(52) U.S. Cl.
CPC .................................. *G06K 9/6255* (2013.01)

(58) Field of Classification Search
CPC ............ G06K 9/6256; G06K 2209/01; G06K 9/00228; G06K 9/4609; G06K 9/4642; G06K 9/6212; G06K 9/6271; G06K 9/6292
See application file for complete search history.

(56) References Cited

U.S. PATENT DOCUMENTS

| | | | |
|---|---|---|---|
| 7,724,960 B1 * | 5/2010 | Mikhael et al. | 382/190 |
| 7,991,715 B2 | 8/2011 | Schiff et al. | |
| 8,126,274 B2 | 2/2012 | Li et al. | |
| 8,213,680 B2 | 7/2012 | Fitzgibbon et al. | |
| 8,520,941 B2 | 8/2013 | Nafarieh et al. | |
| 8,671,112 B2 | 3/2014 | Amar et al. | |
| 2004/0120572 A1 * | 6/2004 | Luo et al. | 382/159 |
| 2005/0129275 A1 * | 6/2005 | Porter et al. | 382/103 |
| 2006/0018521 A1 * | 1/2006 | Avidan | 382/118 |
| 2006/0104487 A1 * | 5/2006 | Porter et al. | 382/118 |
| 2006/0193515 A1 * | 8/2006 | Kim et al. | 382/173 |
| 2007/0047786 A1 | 3/2007 | Aklilu et al. | |
| 2008/0089591 A1 * | 4/2008 | Zhou et al. | 382/224 |
| 2008/0107341 A1 * | 5/2008 | Lu | 382/190 |
| 2009/0074300 A1 * | 3/2009 | Hull et al. | 382/209 |
| 2009/0100050 A1 * | 4/2009 | Erol et al. | 707/5 |
| 2009/0125510 A1 * | 5/2009 | Graham et al. | 707/5 |
| 2014/0072242 A1 * | 3/2014 | Wei et al. | 382/299 |
| 2014/0254923 A1 * | 9/2014 | Vidal Calleja et al. | 382/159 |
| 2015/0055855 A1 * | 2/2015 | Rodriguez et al. | 382/159 |

\* cited by examiner

*Primary Examiner* — Jingge Wu

(74) *Attorney, Agent, or Firm* — Fish & Richardson P.C.

(57) ABSTRACT

A system and method for generating training images. An existing training image is associated with a classification. The system includes an image processing module that performs color-space deformation on each pixel of the existing training image and then associates the classification to the color-space deformed training image. The technique may be applied to increase the size of a training set for training a neural network.

16 Claims, 2 Drawing Sheets

SYSTEM AND METHOD FOR GENERATING TRAINING CASES FOR IMAGE CLASSIFICATION

CROSS REFERENCE TO RELATED APPLICATION

This application claims the benefit of U.S. Provisional Application No. 61/745,713, filed on Dec. 24, 2012, the contents of which are hereby incorporated by reference.

TECHNICAL FIELD

The following relates generally to training image classification neural networks and more specifically to generating training cases for image classification neural networks.

BACKGROUND

Given current processing capability, it is now practical to implement complex neural networks to perform various tasks, such as image classification. Neural networks are configured through learning, which can be referred to as a training stage. In the training stage for image classification, training data (a training set of images each having a known classification) is processed by the neural network. Thus, it is intended that the neural network learn how to perform classification for new images by generalizing the information it learns in the training stage from the training data.

One problem that can occur when training a particularly complex neural network (i.e., a neural network having a large number of parameters) is overfitting. Overfitting occurs when the neural network simply memorizes the training data that it is provided, rather than generalizing well to new examples. Generally, the overfitting problem is increasingly likely to occur as the complexity of the neural network increases.

Overfitting can be mitigated by providing the neural network with more training data. However, the collection of training data is a laborious and expensive task. One proposal has thus been to synthetically and automatically generate new training data from the existing training data. For vision tasks, this can be accomplished by label-preserving two-dimensional spatial deformations of existing training data and adding these spatially deformed images to the training set. However, the generated images will be correlated, likely highly correlated, with the original training images. Furthermore, the increase in size of the training set is limited in this approach. Thus, this technique is generally accepted to be inferior to actually collecting more independent training data.

It is an object of the following to obviate or mitigate at least one of the foregoing issues.

SUMMARY

In one aspect, a system for generating a training image is provided, the system comprising an image processing module operable to perform color-space deformation on an existing training image.

In another aspect, a method for generating a training image is provided.

DESCRIPTION OF THE DRAWINGS

The features of the invention will become more apparent in the following detailed description in which reference is made to the appended drawings wherein.

DETAILED DESCRIPTION

Figure 1:
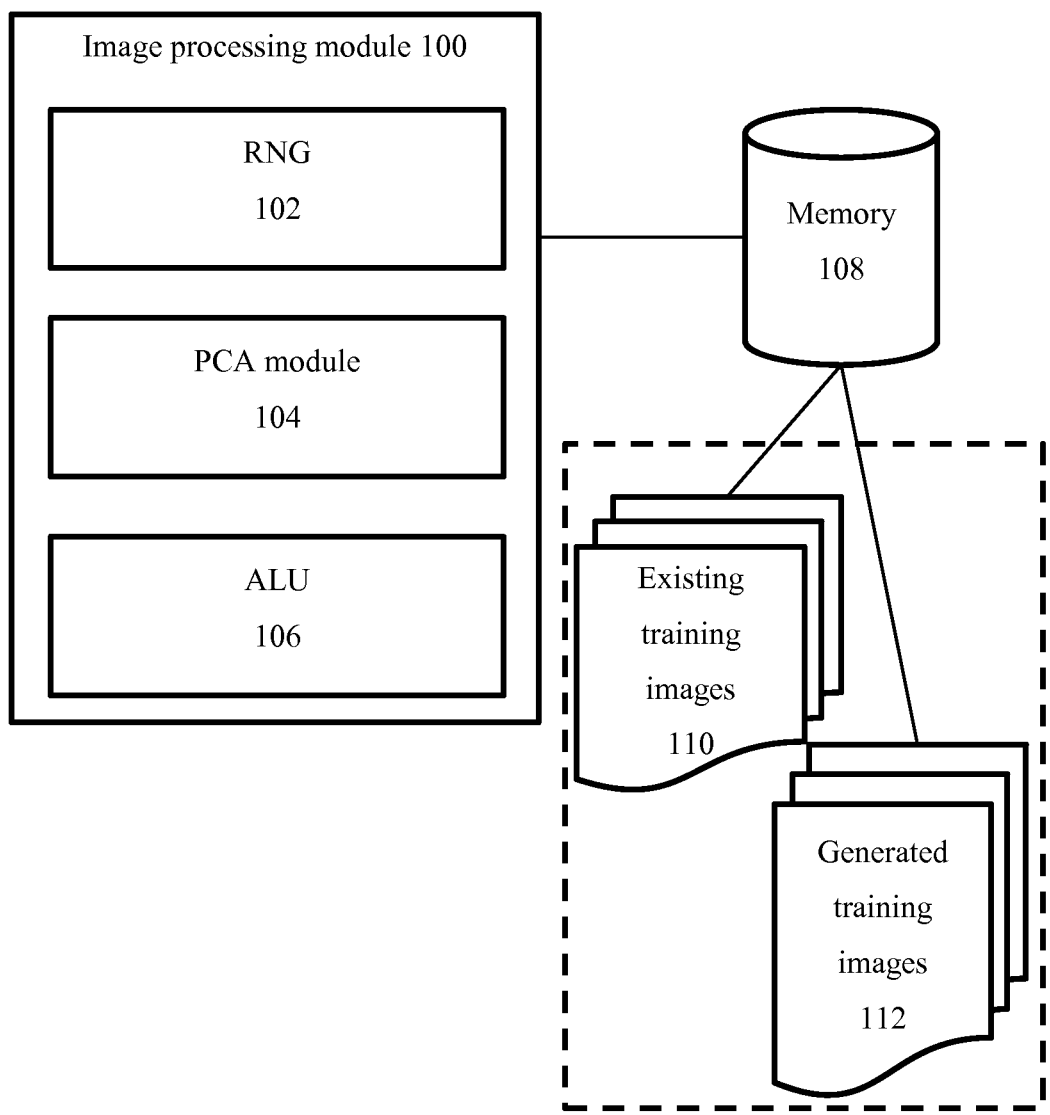
FIG. 1 is an architecture diagram of a system capable of generating training data.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

It has been found that, in general, object identity in a natural image (that is, an image capturing a scene comprising natural features, such as faces and objects, for example) is invariant to changes in image intensity and color. Correspondingly, it is described herein that a training set of images can be generated by performing one or more color-space deformations on an existing training set. In aspects, the specific deformations applied make use of the dimensions in color-space along which images vary most. The generated training set may be used to augment an existing training set.

Referring now to FIG. 1, an image processing module (100) is shown. The image processing module (100) is operable to perform color-space deformation processes. The image processing module (100) may comprise a random number generator (RNG) (102), principal component analysis (PCA) module (104), and an arithmetic logic unit (ALU) (106). A memory (108) linked to the image processing module (100) may further be provided for storing existing training images (also referred to herein as base images) (110) and for enabling the storage of generated training images (112). Training images comprise image data (e.g., pixel data) and classification data (e.g., labels).

Figure 2:
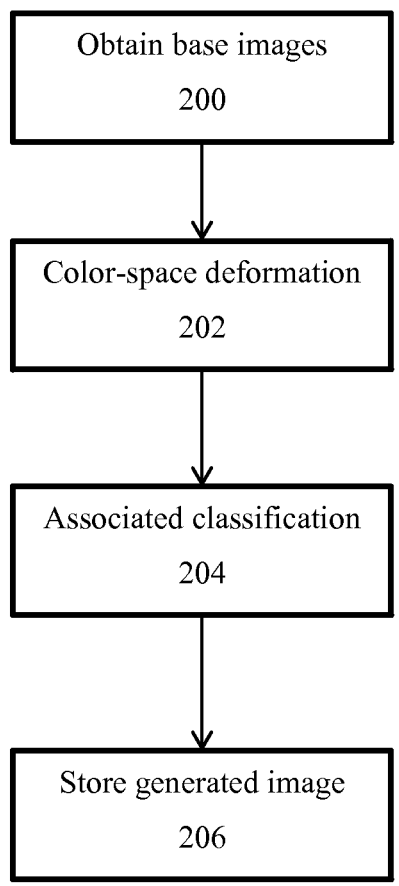
FIG. 2 is a flowchart for generating training data.

Referring now to FIG. 2, in one aspect, the image processing module (100) is operable to obtain from the memory one or more base images (200), perform one or more color-space deformations to the image data for each obtained base images to generate a respective deformed image (202), associate the classification data of each base image with the respective generated image (204) and store the generated image with classification data to the memory (206).

In one aspect, the image processing module may perform more than one color-space deformation for any particular existing training image. It will be appreciated that an increase in the number of deformations applied to training images correspondingly increases the size of the training set, which may be beneficial in various implementations. In this example, it is preferred that such deformations be not identical to reduce correlation in the resulting training set.

In one aspect, the color-space deformation process comprises applying PCA followed by altering the intensities of RGB (red green blue) channels in the training image set. In this example, prior to performing a deformation on the images, the image processing module (100) obtains from the memory the training image set, or a subset thereof and provides the obtained training image set to the PCA module. The PCA module (104) performs PCA on the set of RGB pixel values thoughout the obtained training image set. The PCA module (104) applies PCA to provide the image processing module (100) with at least one principal component each represented by an eigenvalue-eigenvector pair. Preferably, the image processing module uses all principal components. Preferably still, the image processing module rescales noise added to the principal components by the square roots of their eigenvalues.

The image processing module (100) may subsequently multiply the eigenvalues for the selected principal components by a random variable generated by the RNG (102). The RNG (102) may generate the random variable from a Gaussian with mean zero and a preconfigured standard deviation. An example of a suitable standard deviation value is 0.1, although other values may be suitable.

Thus, in this example, the ALU (106) deforms each RGB image pixel $I_{xy} = [I_{xy}^R, I_{xy}^G, I_{xy}^B]^T$ by adding the following quantity:

$$[p_1, p_2, p_3][\alpha_1 \sqrt{\lambda_1}, \alpha_2 \sqrt{\lambda_2}, \alpha_3 \sqrt{\lambda_3}]^T$$

where $p_i$ and $\lambda_i$ are ith eigenvector and eigenvalue of the 3×3 covariance matrix of RGB pixel values, respectively, and $\alpha_i$ is the random variable generated by the RNG (102).

In one aspect, the RNG (102) generates each $\alpha_i$ only once for all the pixels of a particular training image until that image is used for training again, which point the RNG generates a new $\alpha_i$.

Given the color-space deformed image pixels, the image processing module (100) generates the image, associates the label from the base image with the generated image, and stores to the memory (108) the generated image with corresponding label.

In a further aspect, the image processing module may apply a plurality of intensity transformations to different regions of the images, rather than to apply a single intensity transformation to an entire image.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

The invention claimed is:

1. A method performed by one or more computers, the method comprising:
   obtaining training data for a neural network, wherein the training data comprises a plurality of base training images and respective classification data for each of the base training images, and wherein the neural network is configured to receive an input image and predict classification data for the input image, wherein each image comprises data representing pixels having a respective color;
   generating one or more color-deformed images from the base training images of the training data, the generating comprising, for each of the plurality of base training images:
      performing a principal component analysis (PCA) on pixels in a first region of the base training image to obtain a plurality of eigenvector-eigenvalue pairs of a covariance matrix of red green blue (RGB) pixel values from the pixels in the first region of the base training image; and
      applying an intensity transformation of pixel colors of the pixels in the first region of the base training image, comprising:
         randomly selecting a respective value for each eigenvector-eigenvalue pair of the covariance matrix; and
         for each pixel in the first region of the base training image, applying a transformation to the pixel colors of the pixel based on the eigenvector-eigenvalue pairs and the randomly-selected values; and
   adding the one or more color-deformed images to the training data for the neural network.

2. The method of claim 1, wherein the classification data for each of the base training images comprises data that labels one more objects in the base training image.

3. The method of claim 1, wherein each color-deformed image is generated from a respective base training image, and generating each color-deformed image comprises applying one or more color-space deformations to pixel colors of the respective base image.

4. The method of claim 1, wherein generating the one or more color-deformed images from the plurality of base training images of the training data further comprises:
   generating a respective color-deformed image from each of the plurality of base training images, comprising applying the intensity transformation to pixel colors of the pixels in the set of pixels in the first region of the respective base training image, and wherein the method further comprises:
   associating each color-deformed image with the classification data for the base training image from which the color-deformed image was generated; and
   adding each color-deformed image and the associated classification data to the set of training data.

5. The method of claim 4, wherein applying the one or more respective color-space deformations to pixel colors of the first base training image comprises:
   applying a second color intensity transformation to pixel colors of pixels in a second, different region of the base training image.

6. The method of claim 1, wherein the pixel of the first base training image is an RGB image pixel represented by $I_{xy} = [I_{xy}^R, I_{xy}^G, I_{xy}^B]^T$, wherein applying the transformation comprises adding $[p_1, p_2, p_3][\alpha_1 \sqrt{\lambda_1}, \alpha_2 \sqrt{\lambda_2}, \alpha_3 \sqrt{\lambda_3}]^T$ to $I_{xy}$, and wherein $p_i$ is an i-th eigenvector of the covariance matrix, $\lambda_i$ is an i-th eigenvalue of the covariance matrix, and $\alpha_i$ is a randomly-selected value.

7. A system comprising one or more computers and one or more storage devices storing instructions that, when executed by the one or more computers, cause the one or more computers to perform operations comprising:
   obtaining training data for a neural network, wherein the training data comprises a plurality of base training images and respective classification data for each of the base training images, and wherein the neural network is configured to receive an input image and predict classification data for the input image, wherein each image comprises data representing pixels having a respective color;
   generating one or more color-deformed images from the base training images of the training data, the generating comprising, for each of the plurality of base training images:
      performing a principal component analysis (PCA) on pixels in a first region of the base training image to obtain a plurality of eigenvector-eigenvalue pairs of a covariance matrix of red green blue (RGB) pixel values from the pixels in the first region of the base training image; and
      applying an intensity transformation to pixel colors of the pixels in the first region of the base training image, comprising:
         randomly selecting a respective value for each eigenvector-eigenvalue pair of the covariance matrix; and
         for each pixel in the first region of the base training image, applying a transformation to the pixel colors of the pixel bsed on the eigenvector-eigenvalue pairs and the randomly-selected values; and
   adding the one or more color-deformed images to the training data for the neural network.

8. The system of claim 7, wherein the classification data for each of the base training images comprises data that labels one more objects in the base training image.

9. The system of claim 7, wherein each color-deformed image is generated from a respective base training image, and generating each color-deformed image comprises applying one or more color-space deformations to pixel colors of the respective base image.

10. The system of claim 7, wherein generating the one or more color-deformed images from the plurality of base training images of the training data further comprises:
   generating a respective color-deformed image from each of the plurality of base training images, comprising applying the intensity transformation to pixel colors of the pixels in the set of pixels in the first region of the respective base training image, and wherein the method further comprises:
   associating each color-deformed image with the classification data for the base training image from which the color-deformed image was generated; and
   adding each color-deformed image and the associated classification data to the set of training data.

11. The system of claim 10, wherein generating the respective color-deformed image from each of the plurality of base training images further comprises:
   applying a different, second color intensity transformation to pixel colors of pixels in a second, different region of the base training image.

12. The system of claim 7, wherein the pixel of the base training image is an RGB image pixel represented by $I_{xy} = [I_{xy}^R, I_{xy}^G, I_{xy}^B]^T$, wherein applying the transformation comprises adding $[p_1, p_2, p_3][\alpha_1\sqrt{\lambda_1}, \alpha_2\sqrt{\lambda_2}, \alpha_3 29\ \lambda_3]^T$ to $I_{xy}$, and wherein $p_i$ is an i-th eigenvector of the covariance matrix, $\lambda_i$ is an i-th eigenvalue of the covariance matrix, and $\alpha_i$ is a randomly-selected value.

13. A non-transitory computer-readable storage medium encoded with a computer program, the program comprising instructions that when executed by one or more computers cause the one or more computers to perform operations comprising:
   obtaining training data for a neural network, wherein the training data comprises a plurality of base training images and respective classification data for each of the base training images, wherein the neural network is configured to receive an input image and predict classification data for the input image, and wherein each image comprises data representing pixels having a respective color;
   generating one or more color-deformed images from the base training images of the training data, the generating comprising, for each of the plurality of base training images:
      performing a principal component analysis (PCA) on pixels in a first region of the base training image to obtain a plurality of eigenvector-eigenvalue pairs of a covariance matrix of red green blue (RGB) pixel values from the pixels in the first region of the base training image; and
      applying an intensity transformation to pixel colors of the pixels in the first region of the base training image, comprising:
         randomly selecting a respective value for each eigenvector-eigenvalue pair of the covariance matrix; and
         for each pixel in the first region of the base training image, applying a transformation to the pixel colors of the pixel based on the eigenvector-eigenvalue pairs and the randomly-selected values; and
   adding the one or more color-deformed images to the training data for the neural network.

14. The non-transitory computer-readable storage medium of claim 13, wherein the classification data for each of the base training images comprises data that labels one or more objects in the base training image.

15. The non-transitory computer-readable storage medium of claim 13, wherein each color-deformed image is generated from a respective base training image, and generating each color-deformed image comprises applying one or more color-space deformations to pixel colors of the respective base image.

16. The non-transitory computer-readable storage medium of claim 13, wherein generating the one or more color-deformed images from the plurality of base training images of the training data further comprises:
   generating a respective color-deformed image from each of the plurality of base training images, comprising applying the intensity transformation to pixel colors of the pixels in the set of pixels in the first region of the respective base training image, and wherein the method further comprises:
   associating each color-deformed image with the classification data for the base training image from which the color-deformed image was generated; and
   adding each color-deformed image and the associated classification data to the set of training data.

* * * * *